US011528916B2

(12) United States Patent
Gronkjær et al.

(10) Patent No.: US 11,528,916 B2
(45) Date of Patent: Dec. 20, 2022

(54) CUTTING APPARATUS WITH ELEMENT FOR RECEIVING AND ABUTTING CUTTING BLADE

(71) Applicant: MAREL A/S, Arhus (DK)

(72) Inventors: Rune Gronkjær, Ribe (DK); Michael Tjornelund, Randers (DK); Jens Christian Hansen, Tranbjerg (DK)

(73) Assignee: MAREL A/S, Arhus N (DK)

( * ) Notice: Subject to any disclaimer, the term of this patent is extended or adjusted under 35 U.S.C. 154(b) by 0 days.

(21) Appl. No.: 17/428,093

(22) PCT Filed: Feb. 12, 2020

(86) PCT No.: PCT/EP2020/053572
§ 371 (c)(1),
(2) Date: Aug. 3, 2021

(87) PCT Pub. No.: WO2020/165236
PCT Pub. Date: Aug. 20, 2020

(65) Prior Publication Data
US 2022/0039409 A1 Feb. 10, 2022

(30) Foreign Application Priority Data
Feb. 12, 2019 (EP) .................................... 19156719

(51) Int. Cl.
*A22C 17/00* (2006.01)
*A22C 25/18* (2006.01)
(52) U.S. Cl.
CPC .......... *A22C 17/0006* (2013.01); *A22C 25/18* (2013.01)
(58) Field of Classification Search
CPC .. A22C 17/0006; A22C 25/18; A22C 17/0033
See application file for complete search history.

(56) References Cited

U.S. PATENT DOCUMENTS

| 259,711 A * | 6/1882 | Patchell ................. B02C 18/24 |
| | | 241/199.5 |
| 3,803,878 A * | 4/1974 | Lonati .................... D04B 15/60 |
| | | 66/145 R |

(Continued)

FOREIGN PATENT DOCUMENTS

| CN | 1582219 A | 2/2005 |
| CN | 1668426 A | 9/2005 |

(Continued)

OTHER PUBLICATIONS

Extended European Search Report from corresponding European Application No. 19156710.6, dated Sep. 12, 2019.

(Continued)

*Primary Examiner* — Sean M Michalski
(74) *Attorney, Agent, or Firm* — Workman Nydegger

(57) ABSTRACT

A cutting apparatus for cutting a food object includes at least one cutting blade, an actuator arranged for moving the cutting blade before and during cutting, and an element comprising a receiving section arranged for receiving and abutting the cutting blade, and a supporting section arranged for supporting a food object before and during cutting. During cutting, the supporting section is arranged for being displaced, such as displaced by elastic deformation, by the cutting blade with respect to a position of the supporting section prior to cutting. During moving of the cutting blade, the cutting blade is arranged for displacing the supporting section subsequent to the cutting blade abutting the receiving section. The cutting blade and the element are arranged for being continuously in contact with each other.

11 Claims, 4 Drawing Sheets

(56) References Cited

U.S. PATENT DOCUMENTS

| | | | | |
|---|---|---|---|---|
| 4,131,043 A * | 12/1978 | Colman | B26B 29/063 | 83/761 |
| 4,191,076 A * | 3/1980 | Bollmer | B29C 63/06 | 83/13 |
| 5,320,014 A * | 6/1994 | Skaar | B26D 7/0625 | 83/676 |
| 5,404,777 A * | 4/1995 | Skaar | B26D 1/0006 | 83/676 |
| 5,628,237 A * | 5/1997 | Lindee | B26D 7/01 | 83/403.1 |
| 5,711,199 A * | 1/1998 | Hesketh | B27L 5/08 | 144/357 |
| 5,954,720 A * | 9/1999 | Wilson | A61B 18/1445 | 606/174 |
| 5,974,925 A * | 11/1999 | Lindee | B26D 7/01 | 83/403.1 |
| 6,267,033 B1 * | 7/2001 | Gundlach | B26D 7/0625 | 83/676 |
| 6,312,430 B1 * | 11/2001 | Wilson | A61B 18/1445 | 606/174 |
| 8,892,239 B2 * | 11/2014 | Weber | B26D 7/0683 | 700/109 |
| 9,192,218 B1 * | 11/2015 | Kaidi | A45D 29/02 | |
| 2004/0260338 A1 * | 12/2004 | Kupferschmid | A61B 18/1445 | 606/1 |
| 2005/0032471 A1 * | 2/2005 | Pfarr | B65G 43/08 | 452/181 |
| 2005/0252356 A1 | 11/2005 | Beccari | | |
| 2006/0107808 A1 * | 5/2006 | Culling | B26D 7/32 | 83/89 |
| 2006/0154587 A1 * | 7/2006 | Mikkelsen | B26D 5/34 | 452/150 |
| 2007/0157776 A1 * | 7/2007 | Sorensen | A22C 17/0086 | 83/73 |
| 2008/0010835 A1 * | 1/2008 | Mortensen | B26D 3/169 | 30/92 |
| 2010/0212162 A1 * | 8/2010 | Ronan | B26B 17/00 | 30/122 |
| 2011/0154969 A1 | 6/2011 | Weber | | |
| 2012/0270486 A1 * | 10/2012 | Grasselli | A22C 17/02 | 452/150 |
| 2012/0312139 A1 * | 12/2012 | Freund | A22B 5/206 | 83/471.2 |
| 2013/0000454 A1 * | 1/2013 | Miller | B26D 1/08 | 83/13 |
| 2013/0205961 A1 * | 8/2013 | Baechtle | B26D 1/22 | 83/318 |
| 2016/0101536 A1 * | 4/2016 | Gundlach | B26D 1/085 | 83/468 |
| 2017/0202228 A1 * | 7/2017 | Hallvardsson | A22C 17/0073 | |
| 2017/0212506 A1 * | 7/2017 | Pfarr | B26D 5/007 | |
| 2021/0084913 A1 * | 3/2021 | Kido | B26D 3/00 | |
| 2021/0169091 A1 * | 6/2021 | Mayr | A22C 17/0033 | |
| 2022/0022472 A1 * | 1/2022 | Yi | A22C 17/00 | |

FOREIGN PATENT DOCUMENTS

| | | |
|---|---|---|
| EP | 0127462 A1 | 12/1984 |
| EP | 2636495 A1 | 9/2013 |
| WO | 2017125551 A1 | 7/2017 |
| WO | 2019011639 A1 | 1/2019 |

OTHER PUBLICATIONS

International Search Report and Written Opinion from PCT Application No. PCT/EP2020/053572, dated Jul. 1, 2020.

* cited by examiner

CUTTING APPARATUS WITH ELEMENT FOR RECEIVING AND ABUTTING CUTTING BLADE

FIELD OF THE INVENTION

The invention relates to a cutting apparatus for cutting a food object and more particularly a cutting apparatus comprising a cutting blade and an element for receiving and abutting cutting blade before and/or during cutting and a corresponding use and method.

BACKGROUND OF THE INVENTION

In food processing plants cutting cuts of livestock, such primal cuts of cattle or pigs, into sub-cuts might desirably be carried out so as to obtain the sub-cuts in the form of thin slices, e.g., with a thickness (dimension orthogonal to a cutting surface) in the millimeter range, such as 10 mm or less, such as 5 mm or less, such as 3 mm or less. Such cutting (or slicing) might furthermore be carried out at high capacity, and ideally at the same time with high quality, such as leaving behind sub-cuts of well-determined sizes (such as dimensions and/or mass) and with cleanly cut interfaces.

Hence, an improved system, use and method for cutting, such as slicing, a food object would be advantageous, and in particular a system, use and method, which enables cutting into thin slices and optionally does so enabling simultaneously high capacity and quality.

SUMMARY OF THE INVENTION

It may be seen as an object of the present invention to provide a system, use and method, which overcomes the problems mentioned above. Thus, the above-described object and several other objects are intended to be obtained in a first aspect of the invention by providing a cutting apparatus for cutting a food object, said apparatus comprising:

A at least one cutting blade,
An actuator arranged for moving the cutting blade before and during cutting,
and
an element comprising:
  A receiving section arranged for receiving and abutting the cutting blade, such as at a point in time prior to cutting, and
  at least one supporting section arranged for supporting a food object before and during cutting, wherein during cutting the at least one supporting section is arranged for being displaced, such as displaced by elastic deformation, by the cutting blade with respect to a position of the at least one supporting section prior to cutting,
wherein during moving of the at least one cutting blade, the cutting blade is arranged for displacing the at least one supporting section subsequent to the cutting blade abutting the receiving section,
wherein the cutting blade and the element are arranged for being continuously in contact with each other from
  a point of contact is made between the cutting blade and the receiving section prior to cutting, and at least until
  a point in time during cutting.

The invention may be seen as particularly, but not exclusively, advantageous for obtaining a cutting apparatus enabling that the cutting, such as slicing, results in (thin) slices, such as cut of sub-cuts, with thicknesses in the millimeter range, such as 10 mm or less, such as 5 mm or less, such as 3 mm or less. More particularly, by having the element with receiving section and at least one supporting section, the blade can be received by the element and can exert larger and larger elastic forces on the element until it reaches a supporting section, where the physical contact between the cutting blade and the supporting section enables the supporting section to both support the food object and—together with the cutting blade—serve to enable a scissor-effect where an efficient cutting of the food object may be carried out. This may in particular be advantageous if the food object comprises structures, which are not easily cut, such as tendons. Another possible advantage may be that the physical contact between the element and the cutting blade enables keeping the cutting blade relatively clean, such as via the element scraping off debris, such as tissue or protein, from the cutting blade. Another possible advantage may be that the cutting or slicing may be carried out at high capacity and/or quality, such as because the receiving section and at least one supporting section enables that the blade can move quickly through the food object, while still leaving behind thin slices with cleanly cut interfaces.

The cutting apparatus may be arranged for carrying out 60 or more, such as 100 or more, such as 120 or more, such as 180 or more, such as 200 or more, cuts per minute.

The 'food object' may be fish or meat, such as meat, such as meat from cattle or pig, such as a primal cut from cattle or pig. The 'food object' may be a fresh food object, such as non-frozen and/or non-undercooled. The food object may have a mass of at least 100 grams, such as at least 1000 g and/or a mass of less than 10 kg, such as less than 5 kg. The food object may have a mass within 0.1-10 kg, such as within 1-5 kg.

The 'element' may be a monolithic element. The at least one supporting section may be arranged for abutting the cutting blade during cutting.

'Abutting' may be understood as physically touching and may be used interchangeably with 'touching', such as 'physically touching'.

'Actuator', such as a hydraulic, pneumatic and/or electric actuator, may be understood as a component responsible for moving the at least one cutting blade.

It is encompassed that the cutting blade can be constantly or permanently in contact with the element, such as (also) continuously in contact with the element from a point in time during cutting and until a subsequent cut is initiated, including points in time where the first cutting is finished, the cutting blade is moved away from the supporting section, the cutting blade makes contact (again) with the receiving section and the cutting blade (again) starts cutting and makes contact with the at least one supporting section. In an embodiment, the at least one cutting blade loses contact with the element during a period from a point in time during cutting and until a subsequent cut is initiated.

The at least one supporting section is arranged for supporting a food object before and during cutting. The at least one supporting section may be e.g. one, two, three, four etc supporting sections arranged in line of each other and which in total make up one supporting section arranged for supporting a food object before and during cutting where each supporting section can be displaced by the cutting blade.

The receiving section may be arranged so that a food object cannot be placed there before and/or during cutting. This may be advantageous for avoiding contamination or dirtying of the receiving section.

According to an embodiment, there is presented a cutting apparatus wherein, at a point in time, such as at a point in time prior to cutting, where the receiving section abuts the cutting blade, the at least one supporting section and the cutting blade are spaced apart. This may be advantageous in that the cutting blade may be received at the receiving section, while there is still room between the cutting blade and the supporting section for having a food object placed there. This may in turn allow placing a food object at the at least one supporting section, receiving the cutting blade at the receiving section and cutting the food object with the cutting blade.

According to an embodiment, there is presented a cutting apparatus wherein an area of contact (such as a cross-sectional area, such as in a cutting surface, such as in a cutting plane) between the cutting blade and the element is arranged for moving horizontally in a period before and/or during cutting. This may be advantageous because it allows receiving the cutting blade by the element at a left or right side before or during cutting and then moving the area of contact under the food object during cutting. This may in turn be advantageous for achieving a scissor effect during cutting. 'Moving horizontally' may be understood that at least a leftmost or rightmost portion of the area of contact is moving, respectively left or right. Reference to 'left' or 'right' is in this context understood as left or right as observed from a position outside of the cutting surface and looking towards the cutting surface, such as in a direction perpendicular to the cutting surface. The observer is upright, such as wherein left and right are, respectively in a positive and negative direction on a horizontal axis.

According to an embodiment, there is presented a cutting apparatus wherein, the element, such as the at least one supporting section, has a surface, such as a first surface, abutting and/or being adjacent to (such as within 1 mm, such as within 0.5 mm, such as within 0.25 mm, such as within 0.1 mm, within) the cutting blade during cutting, wherein said surface of the element is substantially orthogonal (such as an angle between said surface and the cutting surface is within 80°-100°, such as within 88°-92°), such as orthogonal to a cutting surface, such as a cutting plane. An advantage of this may be that this may enable supporting the food object during cutting. Said surface may furthermore be substantially horizontal (such as an angle between said surface and horizontal is at most 10°, such as at most 2°), such as horizontal. According to an embodiment the element, such as the at least one supporting section, has a further surface (such as a second surface) abutting the (first) surface mentioned above and the cutting blade during cutting, wherein an angle between said further (second) surface of the element and the first surface is acute, such as an angle between said further (second) surface and the first surface is within 60°-89°, such as within 70°-88°, such as within 75°-85°). According to an embodiment a corner radius between the first surface and the second surface is equal to or less than 1 mm, such as equal to or less than 5/10 mm such as equal to or less than 2.5/10 mm (two and a half over ten mm), such as equal to or less than 1/10 mm. An advantage of a small corner radius may be that it helps get the first surface, such as a supporting part of the element, close to the cutting blade, which may in turn enable the scissor effect during cutting and/or reduce a risk that parts of the food objects can go between the cutting blade and the element during cutting.

According to an embodiment, there is presented a cutting apparatus wherein the moving of the cutting blade defines a cutting surface, and wherein the element is arranged so that prior to cutting, the element intersects the cutting surface, and during cutting, the element is pushed at least partially out of the cutting surface by the cutting blade.

This may be advantageous for ensuring that the at least one cutting blade comes into contact with the element (due to the intersection of the cutting surface) and that there is contact between the element and the cutting blade during cutting, such as due to a restoring force pressing the element towards the cutting blade. It may be understood that the edge of the cutting blade traces the cutting surface during its movement during cutting (such as wherein the cutting surface may be a cutting plane, e.g., for a circular blade moving within a plane). According to an embodiment, there is presented a cutting apparatus wherein the cutting blade pushes the element out of the cutting surface by pushing the element in a direction with a component being orthogonal to the cutting surface.

According to an embodiment, there is presented a cutting apparatus wherein the moving of the at least one cutting blade defines a cutting surface, and wherein the element is arranged (such as arranged during use of the cutting apparatus) so that a distance between the element and the cutting blade as measured in a direction perpendicular to the cutting surface decreases continuously during movement of the cutting blade before (such as immediately before, such as continuously along at least the last 5 mm, such as at least the last 10 mm, such as at least the last 20 mm, such as at least the last 50 mm) contact is made at the receiving section. This may be advantageous for receiving the cutting blade, in particular if a movement of the cutting blade is horizontal. Said distance may be decreasing from at least 2 mm to 0 mm, such as from at least 5 mm to 0 mm, such as from at least 10 mm to 0 mm.

According to an embodiment, there is presented a cutting apparatus wherein the at least one supporting section is arranged for being displaced by the cutting blade with respect to a position of the at least one supporting section prior to cutting wherein said displacement of the at least one supporting section by the cutting blade involves a deformation of at least one part, wherein said deformation is within an elastic regime. A possible advantage may be that energy is preserved. The at least one part could be the element itself (or a part thereof). Alternatively, it could be a separate element, such as a spring.

According to an embodiment, there is presented a cutting apparatus wherein the element is arranged subsequent to cutting to move (such as move back) to a position it had prior to cutting, such as wherein it intersects the cutting surface, optionally via elastic (re-)deformation. A possible advantage of moving back may be that the element is ready for performing a similar function during a subsequent cut.

According to an embodiment, there is presented a cutting apparatus wherein the receiving section forms a protruding part of the element. A possible advantage may be that the protruding part can receive the cutting blade at a point, which is not in an area of immediate extension of the remainder of the element, and thus provides a degree of freedom in the point of reception. For example, the point of reception can be above a plane comprising the remainder of the element.

According to an embodiment, there is presented a cutting apparatus wherein the moving of the cutting blade defines a cutting surface, wherein at a point of contact between the element and the cutting blade where said contact is causing the at least one supporting section to be displaced, a Young's modulus of the cutting blade in a direction orthogonal to the cutting surface and away from the element and/or the cutting surface, such as away from the element, is larger than a Young's modulus of the element in a direction orthogonal to the cutting surface and away from the cutting surface and/or away from the cutting blade, such as away from the cutting blade.

The cutting blade displaces the element and not the opposite. A possible advantage is that the cutting blade can be kept relatively rigid (with respect to the element), which may be advantageous for cutting and/or for movement of the cutting blade at high speed.

According to an embodiment, there is presented a cutting apparatus wherein the at least one cutting blade is a circular blade, such as a circular blade moving around an axis being non-coaxial with its own axis. An advantage of a circular blade may be that a circular blade enables better cutting (such as leaving behind cleaner cutting interfaces) than, e.g., a sword blade. An advantage of planetary movement (rotation of the axis around another axis) is that it enables quickly moving the blade into, through and out of the cutting phase. The two axes are non-coaxial, such as at least at a plane orthogonal to the blade's own axis and comprising the circular blade, a distance between the blade's own axis and the (other) non-coaxial axis is at least 1 cm, such as at least 2 cm, such as at least 5 cm, such as at least 10 cm, such as at least 20 cm, such as at least 35 cm, such as at least 50 cm. Alternatively, said distance is at least a distance equal to a radius of the circular blade. A distance between the blade's own axis and the (other) non-coaxial axis is at most 100 cm, such as at most 50 cm, such as at most 35 cm, such as at most 20 cm, such as at most 10 cm. A distance between the blade's own axis and the (other) non-coaxial axis is within 1-100 cm, such as within 10-50 cm. It may be understood that the non-coaxial axis is also substantially parallel with the blade's own axis, such as an angle between them being within 0°-10°, such as within 0°-2°, such as within 0°-1°, such as 0°, such as parallel.

In an alternative embodiment, the movement of the blade is non-circular, such as linear, such as back and forth along a linear path. This may for example be carried out with a saw blade, such as a blade shaped and moved in a manner similar to a guillotine.

According to an embodiment, there is presented a cutting apparatus wherein the element comprises, such as consists of, a polymer, such as polyoxymethylene (POM).

According to an embodiment, there is presented a cutting apparatus wherein the moving of the cutting blade defines a cutting surface, and wherein the element is exclusively on one side of the cutting surface.

According to an embodiment, there is presented a cutting apparatus wherein the cutting apparatus is arranged so that a cut-off part of the food object fulfils a pre-defined criteria, such as thickness (such as wherein slices have a thickness within a range of less than or equal to 10 mm, such as less than or equal to 5 mm, such as less than or equal to 4 mm, such as less than or equal to 3 mm) or mass (such as wherein slices have a mass value within a range of less than or equal to 1000 gram, such as less than or equal to 500 gram, such as less than or equal to 200 gram, such as less than or equal to 100 gram, such as equal to or less than 50 gram, such as equal to or less than 10 gram). Any pre-defined criteria may be a value, such as a thickness value, such as 1 mm, 2 mm, 3 mm, 4 mm, 5 mm, 10 mm, 20 mm, 10 gram, or a mass value, such as 20 gram, 50 gram, 60 gram, 100 gram, 200 gram, 500 gram, 1 kg, optionally with a tolerance, such as an allowed deviation from said value in a negative and/or positive direction of within 1%, 2%, 5%, 10%, 20% or 50%.

According to an embodiment, there is presented a cutting apparatus wherein the moving of the cutting blade defines a cutting surface, wherein the cutting apparatus is further comprising:

A conveyor for conveying the food object from:

A first position wherein the food object does not intersect the cutting surface, to A second position wherein the food object does intersect the cutting surface, such as wherein the food object will be cut, such as sliced or completely cut, upon movement of the cutting blade.

'Conveying' may be understood as conveying along a path, which intersects a cutting surface as defined by the movement of the cutting blade during cutting, such as a cutting area swept by the cutting blade, such as wherein the path of the conveyor is substantially orthogonal to the cutting surface at the position of the cutting surface.

In an embodiment, the conveyor may be arranged for placing the food object on the at least one supporting section, such as wherein a food object in the second position is supported by the at least one supporting section before and/or during cutting.

Optionally, the conveyor is arranged so as to be incapable of placing a food object in contact with the receiving section, such that it is capable only of placing the food object on the at least one supporting section. This may be advantageous for safeguarding that the receiving section is not contaminated or dirtied by the food object.

According to an embodiment, there is presented a cutting apparatus wherein:

a food object may be placed by the conveyor in the second position, such as moved from the first position to the second position, when the cutting blade is moved the cutting blade intersects (such as intersects and cuts) the food object in the second position.

According to a second aspect, there is presented use of the apparatus according to the first aspect for cutting, such as slicing (such as wherein slices have a thickness of less than or equal to 10 mm, such as less than or equal to 5 mm, such as less than or equal to 4 mm, such as less than or equal to 3 mm), a food object, such as a fish object or a meat object.

According to a third aspect, there is presented a method for cutting a food object, said method comprising moving a cutting blade so that the cutting blade is received by and abuts a receiving section of an element, such as received by and abuts a receiving section prior to cutting, and subsequently the cutting blade displaces, such as displaces by elastic deformation, during cutting a supporting section of the element with respect to a position of the at least one supporting section prior to cutting, said at least one supporting section being arranged for supporting the food object during cutting, wherein the cutting blade and the element are continuously in contact with each other from a point of contact is made between the cutting blade and the receiving section prior to cutting, and at least until a point in time during cutting.

It is understood, that cutting of the food object takes place by moving the cutting blade, such as said moving of the cutting blade is understood to be moving of the cutting blade through the food object and hence cutting the food object.

According to an embodiment there is presented a method wherein the food object is fresh, such as non-frozen and/or non-undercooled and/or non-crust-frozen, and/or a temperature of the food object is above 0° Celsius. A possible advantage of this is that it allows keeping the food object fresh, which may avoid a reduction in shelf life of the food object. Furthermore, it may enable dispensing with equipment and processes necessary for cooling of the food object.

The first, second, and third aspect of the present invention may each be combined with any of the other aspects. These and other aspects of the invention will be apparent from and elucidated with reference to the embodiments described hereinafter.

BRIEF DESCRIPTION OF THE FIGURES

The cutting apparatus, use and method for cutting a food object according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
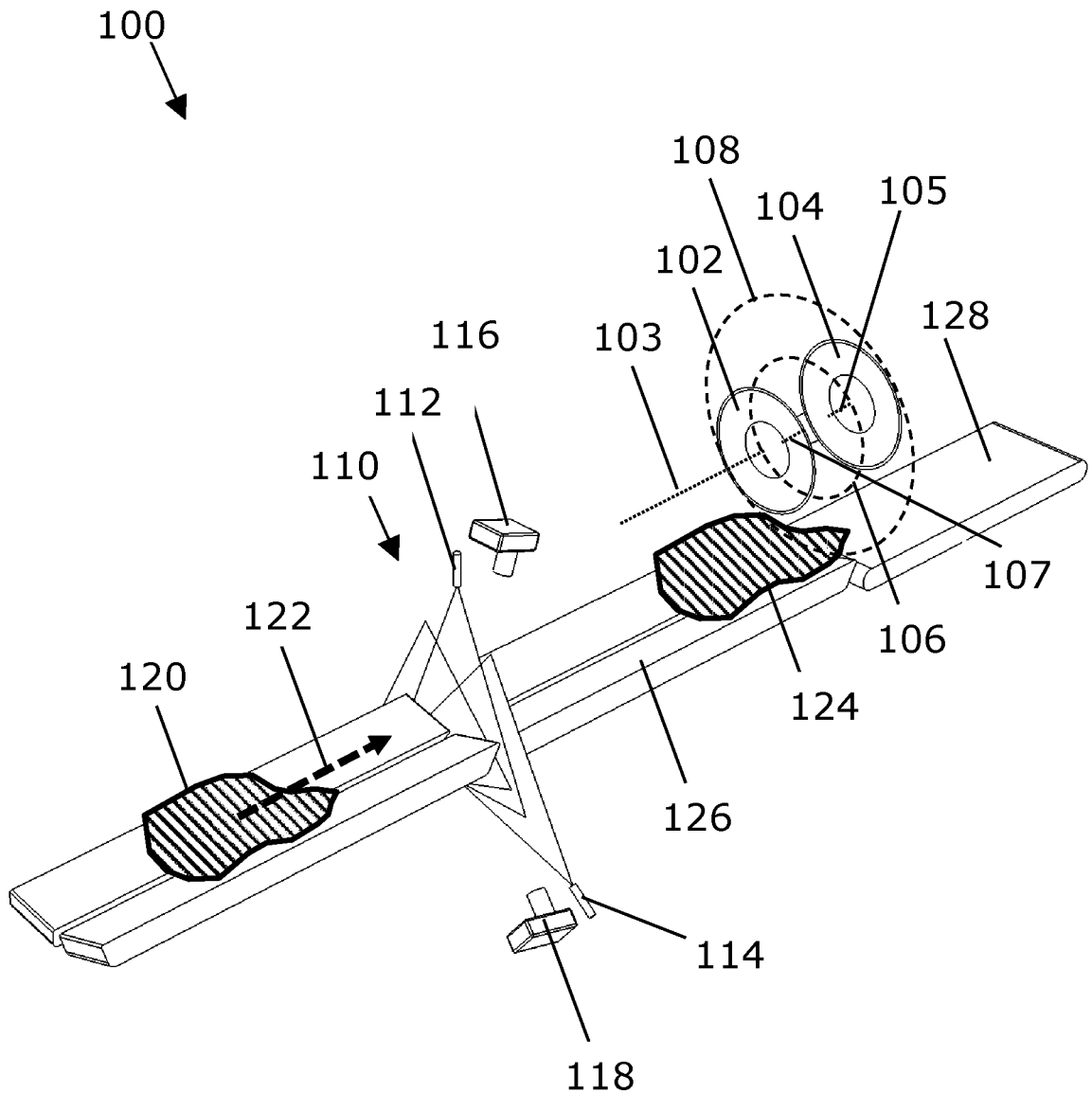
FIG. 1 shows a cutting apparatus with a conveyor.

FIG. 1 shows a cutting apparatus 100 comprising a at least one cutting blade, which is a circular blade 102 being rotatable around a first axis 103 through a centre of the circular blade, and wherein the circular blade 102 and in particular the first axis 103, is rotatable around a second axis 107, wherein the second axis is parallel and non-coaxial with respect to the first axis. The rotation of the first axis 103 around second axis 107 thus defines a circle 106 and the area swept by the circular blade 102 has a circular outer limit 108. The circular blade 102 in the present embodiment is a first circular blade, which defines a cutting plane, and wherein the cutting apparatus is further comprising a second circular blade 104 being rotatable around a third axis 105 through a centre of the second circular blade, wherein the third axis is parallel and non-coaxial with respect to each of the first axis 103 and the second axis 107, wherein the second circular blade 104 is substantially within, such as within, the cutting plane, and wherein the second circular blade (104) is rotatable around the second axis. Both of the first circular blade 102 and the second circular blade 104 are arranged on a common member and arranged for making a planetary movement around a common axis 107. The apparatus comprises an actuator (not shown) arranged for moving the at least one cutting blade before and during cutting, and an element (see FIGS. 2-5) at the end of conveyor 126. The cutting apparatus 100 furthermore comprises a measurement device 110 for determining a position of at least a part of the surface of the food object 120, 124 to be cut. The measurement device 110 is a height profiler comprising line lasers 112, 114 and an imaging system with cameras 116, 118 for acquiring image data of lines of the line lasers and thereby of the food object 120, 124 (in the present embodiment there is a plurality of each of cameras and line lasers, more particularly three of each where only two are visible in the figure). The cutting apparatus further comprises a conveyor 126 for conveying the food object from a first position wherein the food object 120 (where food object 120 is shown in the first position and moving in a conveying direction as indicated by arrow 122) does not intersect the cutting plane to a second position wherein the food object 124 (where food object 124 is shown in the second position and kept still or moved at a low speed (such as a speed of movement being 0-2 mm/second, such as 0-1 mm/second) for cutting by the first circular blade 102) intersects the cutting plane, and wherein the food object will be cut upon rotation (in a counter-clockwise direction as observed from the first position) of the circular blade 102 around the second axis 107. The cutting apparatus furthermore comprises a second conveyor 128 for conveying one or more sub-cuts (piece(s) cut of the food object) away from the cutting plane.

Figure 2:
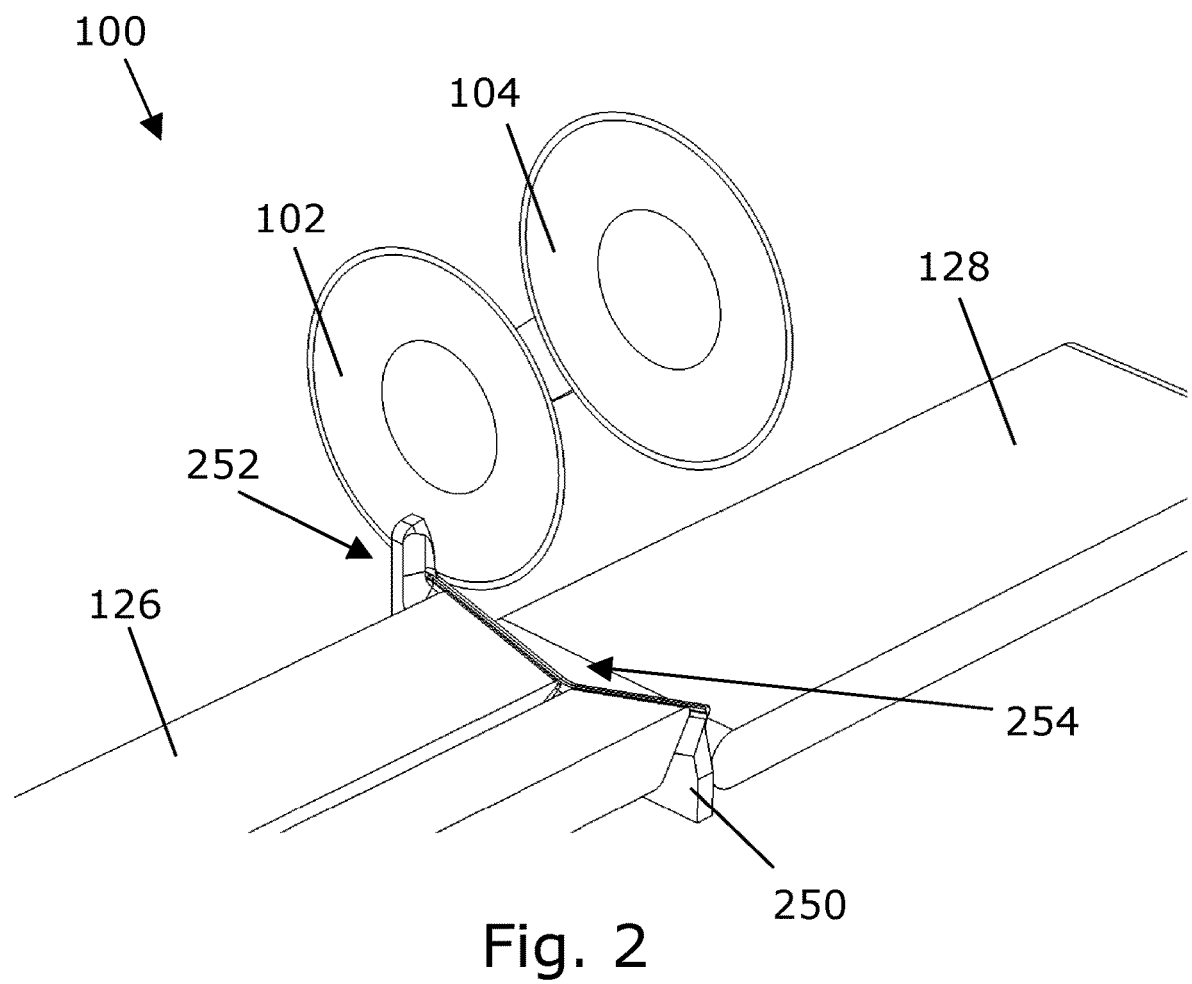
FIG. 2 shows a cutting apparatus with a conveyor and an element.

FIG. 2 shows a close-up of the cutting apparatus 100 comprising at least one cutting blade, wherein the element 250 can be seen, and wherein said element is comprising:

A receiving section 252 arranged for receiving and abutting the at least one cutting blade 102, 104, such as at a point in time prior to cutting, and at least one supporting section 254 arranged for supporting a food object before and during cutting, wherein during cutting the at least one supporting section is arranged for being displaced, such as displaced by elastic deformation, by the cutting blade with respect to a position of the at least one supporting section prior to cutting, wherein during moving of the cutting blade, the cutting blade is arranged for displacing the at least one supporting section subsequent to the cutting blade abutting the receiving section, wherein the cutting blade and the element are arranged for being continuously in contact with each other from a point of contact is made between the cutting blade and the receiving section prior to cutting, and at least until a point in time during cutting.

The receiving section 252 is arranged for receiving and abutting the cutting blade prior to displacing the at least one supporting section 254. Depending on the particular arrangement and/or the position of at least a portion of the food object, the cutting blade may initiate cutting of the food object prior or subsequent to being received by and abutting the receiving section.

Figure 3:
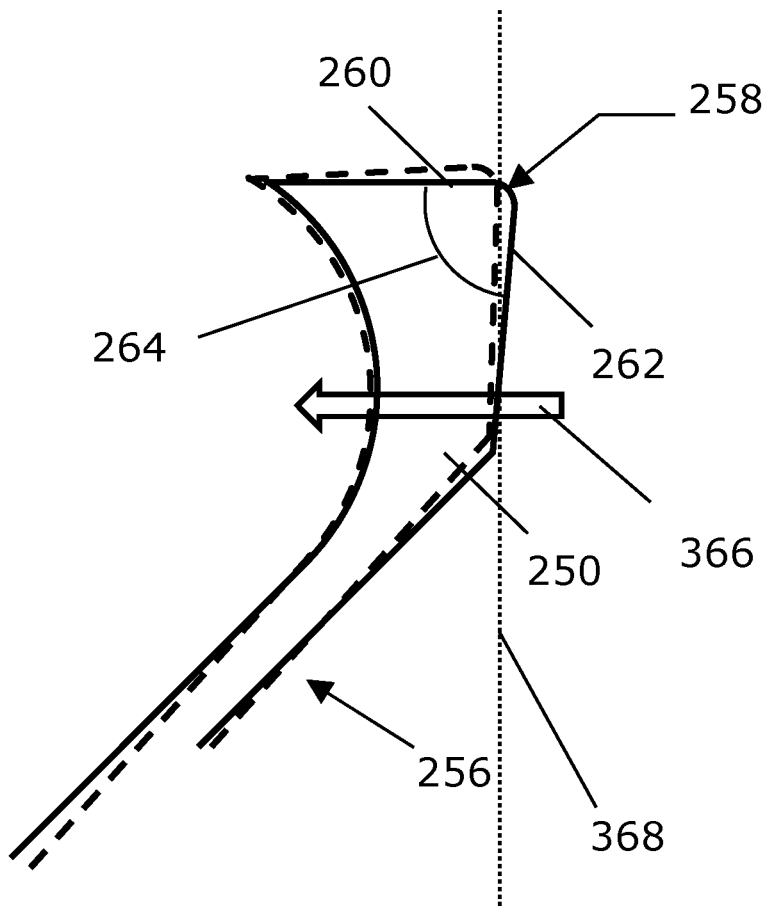
FIG. 3 shows a cross-sectional view of an element in a vertical plane orthogonal to the cutting surface.

FIG. 3 shows a cross-sectional view of an element in a vertical plane orthogonal to the cutting surface. The vertical plane is at a position intersecting the at least one supporting section, where it could intersect a food object to be cut, such as intersecting also a middle of the conveyor 126 (cf., FIGS. 1-2). The figure shows with the full drawn line element 250 in a non-displaced position, such as prior to cutting. The figure furthermore shows with the dashed line the element in a displaced, such as during cutting. The displacement and direction of displacement by the cutting blade is shown with open arrow 366. The cutting surface is shown with the dotted line 368. The cutting blade, which is displacing the element, is not shown, but would be substantially vertical and touching the right hand side of the element 250 as depicted in this figure. The figure also shows a first surface 260 of the element abutting and/or being adjacent to (such as within 1 mm, such as within 0.5 mm, such as within 0.25 mm, such as within 0.1 mm, within) the cutting blade during cutting, wherein said surface of the element is substantially orthogonal (such as an angle between said surface and the cutting surface is within 80°-100°, such as within 88°-92°), such as orthogonal to the cutting surface. A food object may be placed upon and supported by the first surface before and during cutting. Said surface may furthermore be substantially horizontal (such as an angle between said surface and horizontal is at most 10°, such as at most) 2°, such as horizontal. The element 250 also has a second surface 262 abutting the first surface 260 and the cutting blade during cutting. An angle 264 between the first surface and the second surface is acute, such as the angle being within 60°-89°, such as within 70°-88°, such as within 75°-85°. A corner radius 258 between the first surface and the second surface is equal to or less than 1 mm, such as equal to or less than 5/10 mm such as equal to or less than 2.5/10 mm (two and a half over ten mm), such as equal to or less than ¹⁄₁₀ mm. The element has a relatively thin section 256 (such as relatively thin with respect to other parts of the element), which enables flexibility, such as a low Young's modulus with respect to the cutting blade.

Figure 4:
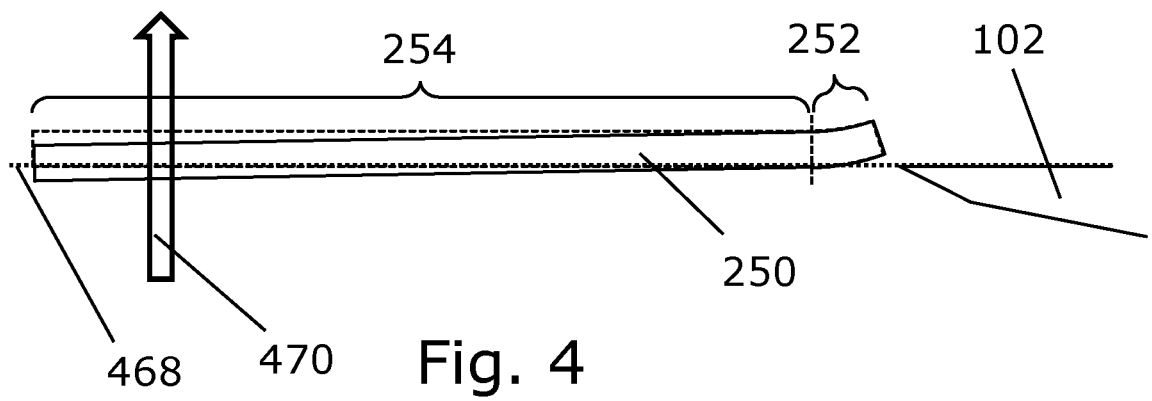
FIG. 4 shows a cross-sectional view of an element in a horizontal plane orthogonal to the cutting surface.

FIG. 4 shows a cross-sectional view of an element 250 in a horizontal plane orthogonal to the cutting surface. The element comprises a receiving section 252 and a at least one supporting section 254. The cutting blade 102 is shown, and is understood to be moving from right to left. The moving of the cutting blade defines a cutting surface (such as the edge of the cutting blade tracing the cutting surface). The moving of the cutting blade defines a cutting surface 468 and the element is arranged so that a distance between the element 250 and the cutting blade 102 as measured in a direction perpendicular to the cutting surface (i.e., up-down on the paper of the figure) decreases continuously during movement of the cutting blade before contact is made at the receiving section. In the shown embodiment, a distance between the element and the cutting surface increases continuously in a direction away from the at least one supporting section as observed along a vertical line-of-sight (i.e., in a direction perpendicular to the plane of the paper). In the figure, this can be seen at the receiving section 252, which is moving slightly upwardly in a direction from left to right. This enables receiving the cutting blade in a smooth manner, such as so that the cutting blade is received in a rather gradual manner. The figure shows with the full drawn line element 250 in a non-displaced position, such as prior to cutting. The figure furthermore shows with the dashed line the element in a displaced position, such as during cutting. The displacement and direction of displacement by the cutting blade is shown with open arrow 470. The cutting surface is shown with the dotted line 468.

Figure 5:
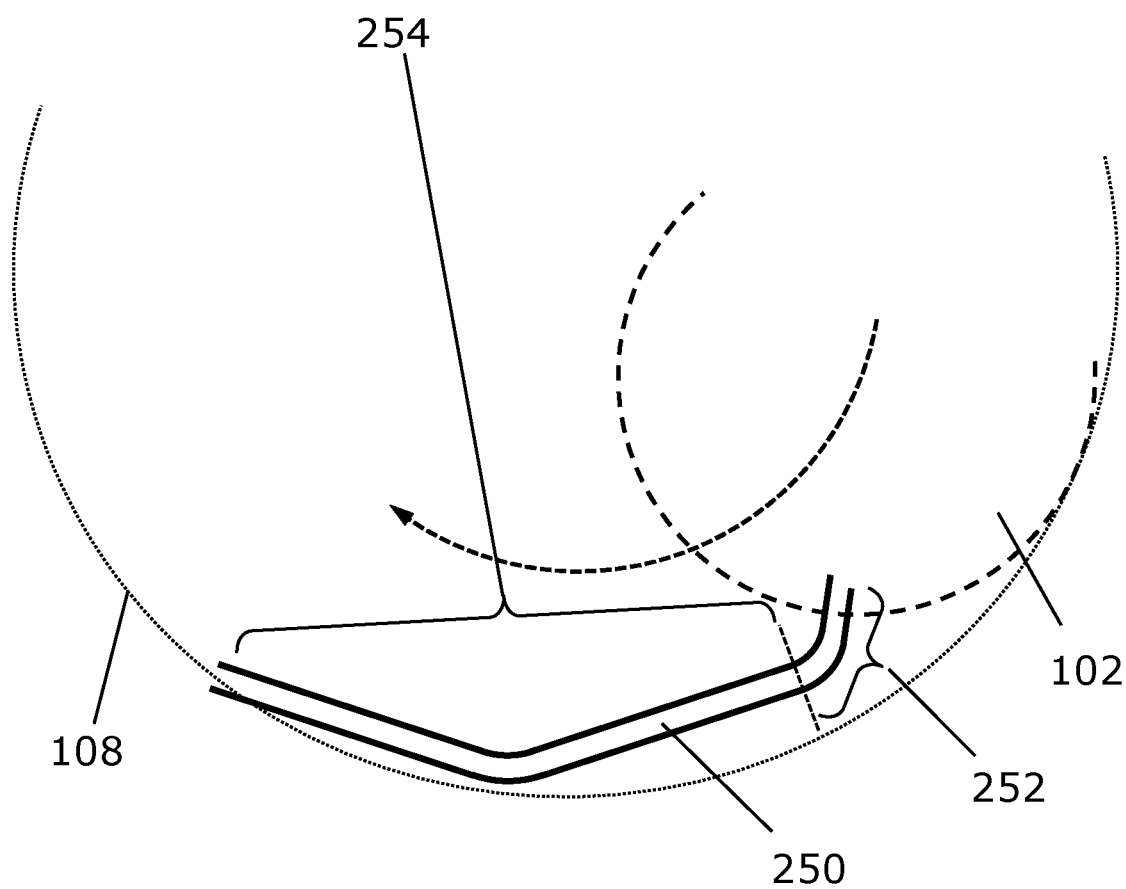
FIG. 5 shows a cross-sectional view of an element in a plane co-incident with the cutting surface.

FIG. 5 shows a cross-sectional view of an element 250 in a plane co-incident with the cutting surface. The figure shows the element 250 with receiving section 252 and at least one supporting section 254. The figure furthermore shows at least one cutting blade 102, being a circular blade moving (such as indicated by the dashed arrow) around an axis being parallel and non-coaxial with its own axis, where the rotation results in an area swept by the circular blade 102, which has a circular outer limit 108. The point in time of the figure is a point in time prior to cutting, where the receiving section abuts the cutting blade while the at least one supporting section and the cutting blade are spaced apart. An area of contact between the cutting blade and the element is moving horizontally (from right to left) in a period before and during cutting.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A cutting apparatus for cutting a food object, said apparatus comprising:
   at least one cutting blade configured to move along a vertical plane and within a cutting area defined by a predetermined outer limit traced by an edge of the cutting blade;
   a actuator arranged for moving the at least one cutting blade before and during cutting; and
   a three-dimensional structural element formed from a polymeric material and defining a receiving section and at least one supporting section;
   wherein the receiving section is arranged for receiving and abutting the cutting blade at a point in time prior to cutting; and
   wherein the least one supporting section is arranged for supporting a food object before and during cutting;
   wherein during cutting the at least one supporting section is arranged for being displaced by elastic deformation by the cutting blade with respect to a position of the at least one supporting section prior to cutting;
   wherein during moving of the cutting blade, the cutting blade is arranged for displacing the at least one supporting section subsequent to the cutting blade abutting the receiving section;
   wherein the cutting blade and the element are arranged for being continuously in contact with each other from a point of contact made between the cutting blade and the receiving section prior to cutting, and at least until a point in time during cutting;
   wherein the cutting apparatus further comprises a first conveyor for conveying the food object from a first position in a conveying direction wherein the food object does not intersect the cutting area, to a second position wherein the food object does intersect the cutting area and places the food object on the at least one supporting section, and a second conveyor arranged to conveyor the food object away from the cutting blade in the conveying direction;
   wherein the conveying direction is substantially orthogonal to the vertical plane and the cutting area;
   wherein the receiving section forms a protruding part of the element to receive the cutting blade at a point of reception, the point of reception being above the at least one supporting section and on the vertical plane.

2. The cutting apparatus according to claim 1, wherein an area of contact between the cutting blade and the element is arranged for moving horizontally in a period before first conveyor conveys the food object to the at least one supporting section and/or during cutting.

3. The cutting apparatus according to claim 1, wherein, the element, including the at least one supporting section, has a surface abutting and/or being adjacent to the cutting blade during cutting;

wherein said surface of the element is substantially orthogonal to the conveying direction of the first conveyor, and orthogonal to the cutting area.

4. The cutting apparatus according to claim 3, wherein the element is arranged so that prior to cutting, the element intersects the cutting area, and during cutting, the element is arranged to be pushed at least partially out of the cutting area by the cutting blade.

5. The cutting apparatus according to claim 3, wherein the at least one supporting section formed by a polymeric material is arranged for being displaced by the cutting blade with respect to a position of the at least one supporting section prior to cutting;
   wherein said displacement of the at least one supporting section by the cutting blade involves a deformation of at least one part;
   wherein said deformation is within an elastic regime.

6. The cutting apparatus according to claim 1, wherein the element is arranged to move, subsequent to cutting, to a position it had prior to cutting intersecting the cutting area.

7. The cutting apparatus according to claim 1, wherein the element extends horizontally beyond the conveyor such that the receiving section is arranged horizontally beyond the conveyor.

8. The cutting apparatus according to claim 1, wherein the element is in line with or below a conveying area of the first conveyor and in line with or above a conveying area of the second conveyor, wherein the conveying area of the first conveyor conveys the food object from the first position to the second position in a conveying direction and the conveying area of the second conveyor conveys the food object away from the cutting blade in the conveying direction.

9. The cutting apparatus according to claim 1, wherein the at least one supporting section has a first surface adjacent to the cutting blade during cutting that is orthogonal to the cutting area and a second surface adjacent to both the first surface and cutting blade during cutting, wherein the angle between the first and second surfaces is within 60°-89°.

10. The cutting apparatus according to claim 9, wherein the first surface and second surface form a corner radius that is equal to or less than 1 mm.

11. A method for cutting a food object using the cutting apparatus of claim 1, said method comprising moving the cutting blade so that the cutting blade is received by and abuts the receiving section of the element, by being received by and abutting a receiving section prior to cutting, and
   subsequently, the cutting blade displaces by elastic deformation, during cutting the at least one supporting section of the element with respect to a position of the at least one supporting section prior to cutting, said at least one supporting section being arranged for supporting the food object during cutting,
   wherein the cutting blade and the element are continuously in contact with each other from a point of contact is made between the cutting blade and the receiving section prior to cutting, and at least until a point in time during cutting.

* * * * *